United States Patent Office 3,560,852
Patented Feb. 2, 1971

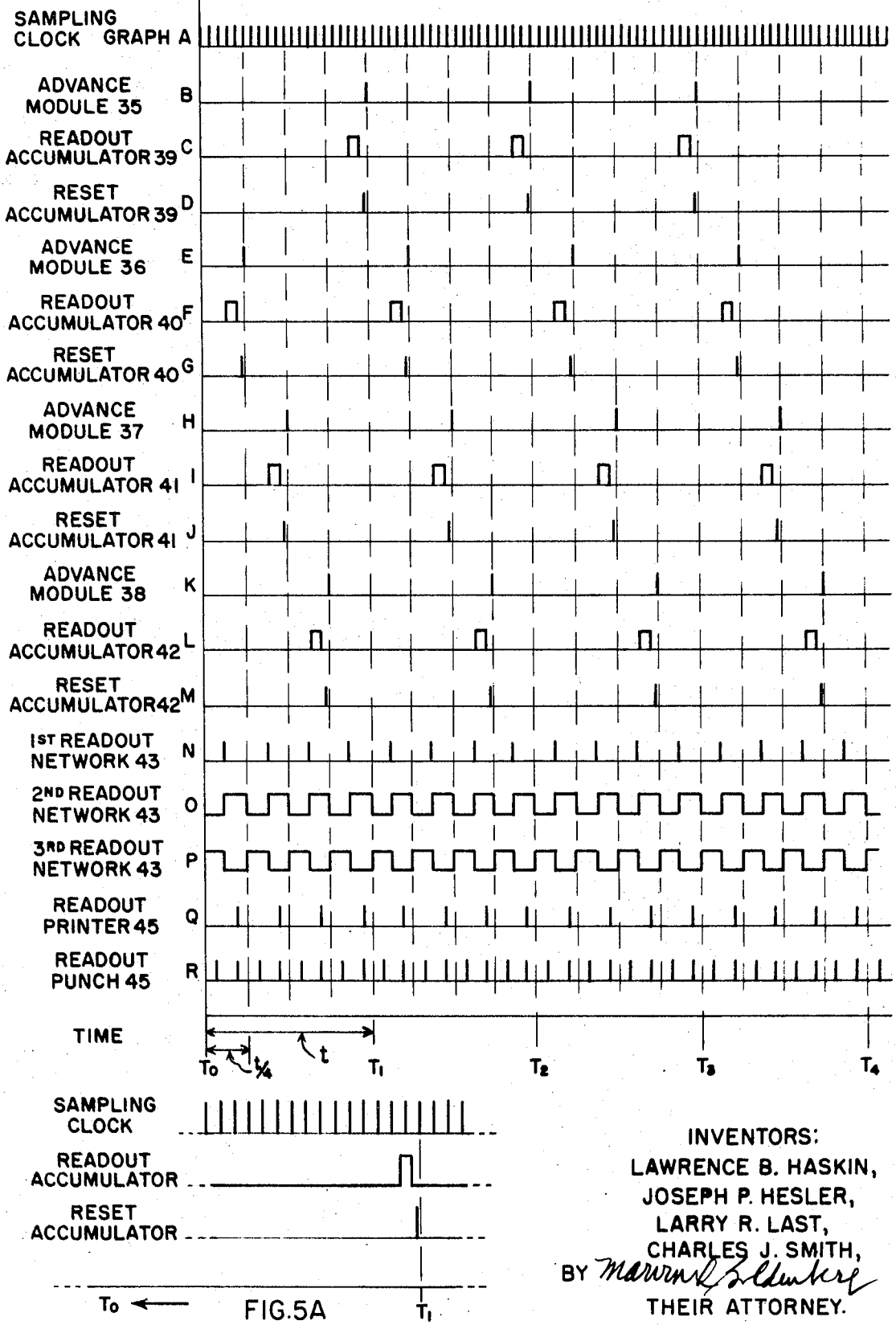

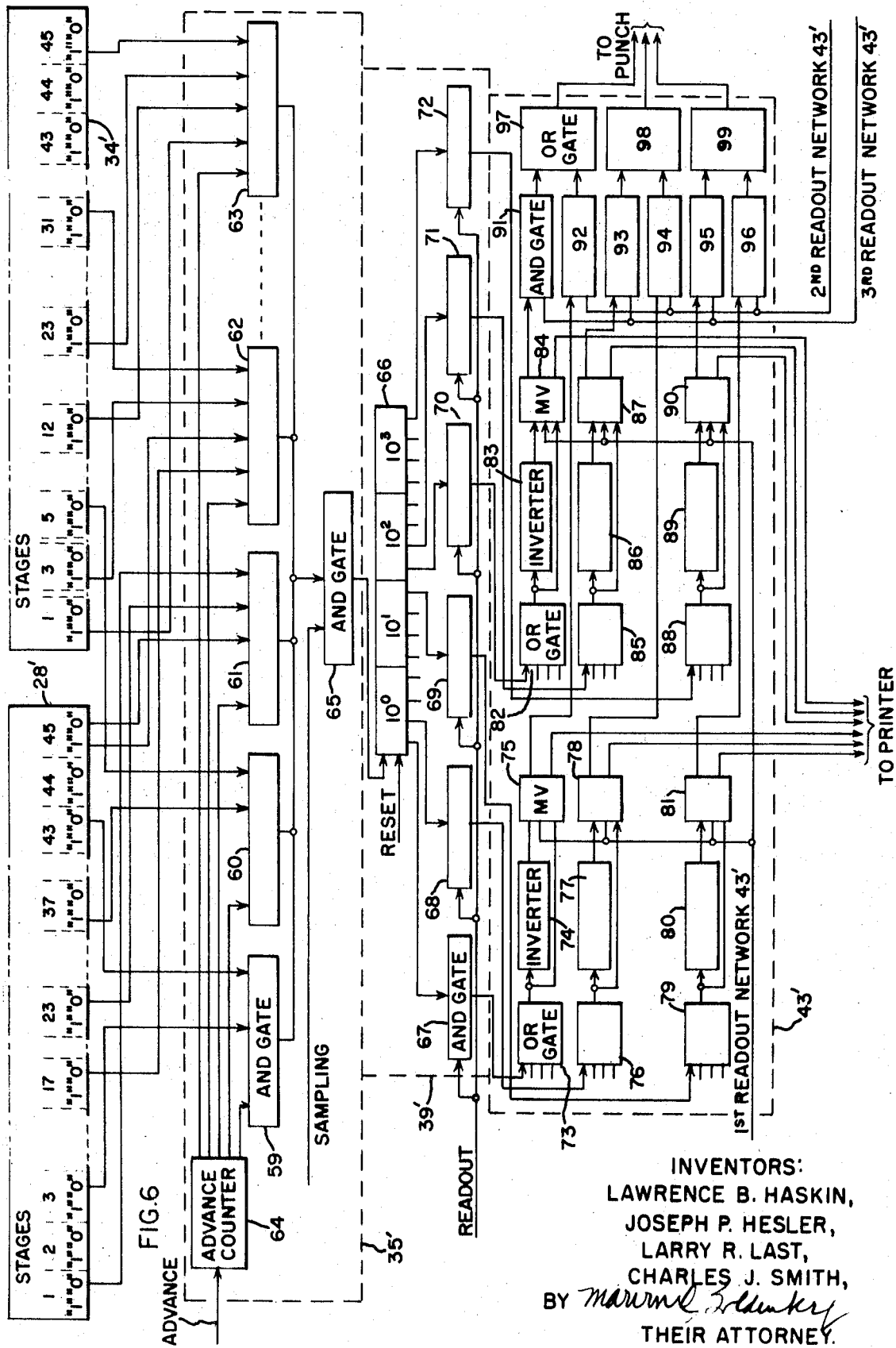
INVENTORS:
LAWRENCE B. HASKIN,
JOSEPH P. HESLER,
LARRY R. LAST,
CHARLES J. SMITH,
BY THEIR ATTORNEY.

3,560,852
ELECTRICAL WAVEFORM ANALYZER AND DATA TABULATION SYSTEM COMBINING DIGITAL AND MULTIPLEXING TECHNIQUES
Lawrence B. Haskin and Joseph P. Hesler, Liverpool, N.Y., and Larry R. Last, Cincinnati, and Charles J. Smith, West Chester, Ohio, assignors to General Electric Company, a corporation of New York
Filed Sept. 30, 1968, Ser. No. 763,902
Int. Cl. G01r 23/16
U.S. Cl. 324—77
9 Claims

ABSTRACT OF THE DISCLOSURE

A system for analyzing analog electrical waveforms of relatively high complexity in amplitude and frequency employing digital techniques for tabulating certain data derived from the waveforms, which data can be employed to categorize said waveforms. Within selected bands of the input frequency spectrum, the input analog signal is digitally encoded and through multiplexing a tabulation is made of particular binary word characteristics. By means of further multiplexing, the tabulated data is read out to suitable output means. An important application of the system is to rotating machinery noise and vibration analysis.

BACKGROUND OF THE INVENTION

(1) Field of the invention

The invention relates generally to the field of waveform analysis and pattern recognition as applied to electrical signals.

(2) Description of the prior art

The analysis of complex electrical waveforms derived from physical sources, for example jet engines and the like, human speech, printed material, etc., is becoming of increasing interest for providing an automatic identification or categorization of said sources and various characteristics thereof. One common method of automatically analyzing complex waveforms is a spectrum analysis wherein energy measurements are taken for selected bands of frequencies. Either a swept local oscillator and a single filter or a fixed frequency band and filter bank may be used. Another common method embodies the use of cross and auto correlation techniques, normally requiring an analog recording of the signal for subsequent off line analysis. For both of these methods a careful gain calibration must be maintained throughout the processes. In each case it also takes a relatively long time to complete the process and, therefore, accurate real time measurements cannot be readily made. Further phase relationships of the processed information is lost in the spectrum analysis and only partially preserved employing correlation techniques.

SUMMARY OF THE INVENTION

It is accordingly an object of the invention to provide a novel waveform analyzer and data tabulation system which is capable of rapidly accepting and tabulating data from a complex electrical waveform, so as to make possible a real time operation.

It is a further object of the invention to provide a novel data tabulation system as above described which does not require gain calibration.

It is another object of the invention to provide a novel data tabulation system as above described which has the capability for responding to phase as well as frequency information of said complex electrical waveform.

It is another object of the invention to provide a novel data tabulation system as above described for tabulating identifying signal characteristics of a complex electrical waveform through the employment of digital techniques.

A further object of the invention is to provide a novel data tabulation system as above described which employs multiplexing techniques for improving the speed of operation and for generating outputs in a form compatible with standard computer requirements.

A still further object of the invention is to provide a novel data tabulation system as above described having application to an analysis of rotating machinery noise and vibrations.

In accordance with these and other objects of the invention there is provided a data tabulation system responsive to complex electrical waveforms which typically may be derived from engine noise and vibration, that includes a preprocessing stage for selecting particular frequency bands of the input spectrum and a main processing stage for accumulating data with respect to selected binary characteristics of said selected bands. The preprocessing stage includes a product detector to which is coupled the input signal together with a second discrete signal frequency derived from the input signal by means of a tracking filter and an adjustable frequency multiplier. The mixing action in the product detector generates a detected signal of interest from within the input signal spectrum. The detected signal is filtered and digitally encoded into a binary sequence of "1's" and "0's" in accordance with one or more coding algorithms, and the frequencies of occurrence of certain binary words are tabulated by means of a multiplex arrangement. By means of further multiplexing the tabulated data is coupled through an output buffer network to suitable output components.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

FIG. 5 is a timing diagram illustrating the various timing pulses that control the sequences of operations in the system;

FIG. 5A is an expanded view of a portion of the diagram of FIG. 5; and

FIG. 6 is a more detailed illustration of a portion of the system of FIG. 3.

DETAILED DESCRIPTION OF THE INVENTION

Figure 1:
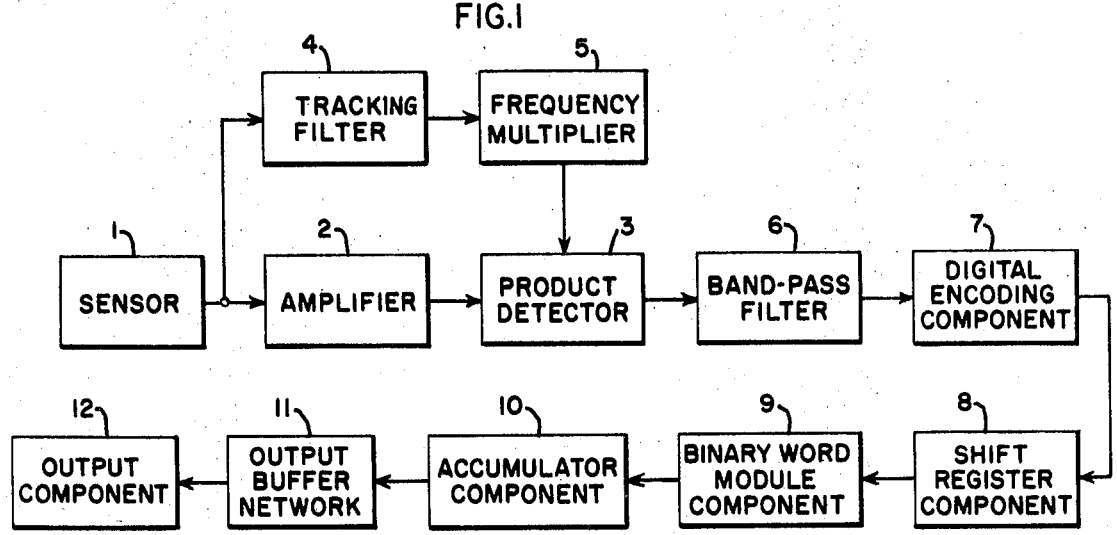
FIG. 1 is a schematic block diagram of a waveform analyzer and data tabulator system in accordance with the invention.

With reference to FIG. 1, there is illustrated a schematic block diagram of a waveform analyzer and data tabulation system which responds to relatively complex analog electrical signals derived from an input source and processes them so as to provide a real time tabulation of significant signal characteristics of said signals in the form of binary words, from which a categorization of the input and/or various characteristics thereof can subsequently be made. In the operation of the system, selected bands centered on particular frequencies of interest within the overall input frequency spectrum are processed one at a time.

The input source may take a number of different forms, for example, rotating machinery noise, human speech, printed material, etc. In the embodiment under consideration a jet engine noise and vibration analysis is performed. It is found that various characteristics of the engine operation are represented by relatively discrete frequencies or bands of frequencies within the total generated noise frequency spectrum. In a jet engine, rotation of the turbocompressor rotors produces what are normally the principal frequency components in the overall noise frequency spectrum. Significant moving parts of the engine, e.g., the gears, turbine blades, etc., produce other dominant frequency components related by a fixed ratio to the rotor frequency. By tabulating data that provides a measure of the energy within these frequency components including any changes that may occur, there is provided a means for evaluating overall engine operation and for detecting general and specific malfunctions.

Figure 2:
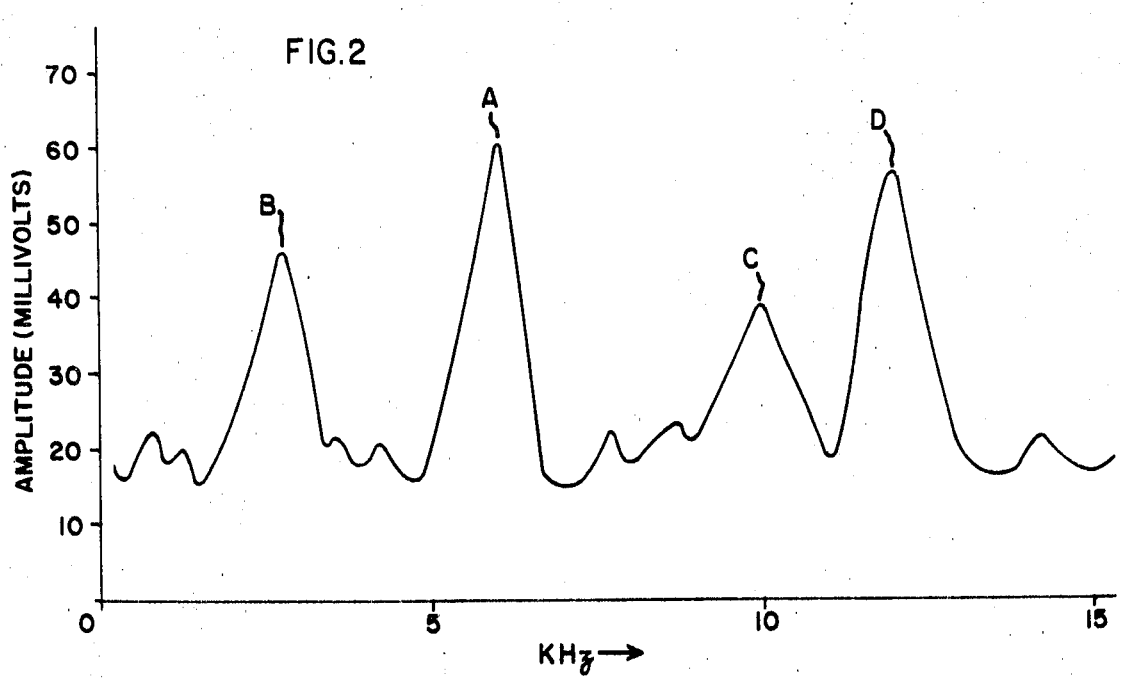
FIG. 2 is a graph of the frequency distribution of an exemplary input signal applied to the system of FIG. 1.

The system is shown to include a sensor 1 which transduces energy from the input source, not shown, into a corresponding analog electrical signal extending typically over a band of 0 to 15 kHz. An exemplary frequency distribution of the input signal is illustrated in FIG. 2. The sensor 1 typically includes a microphone, not shown, strategically placed with regard to the source of noise and vibrations. The output of the sensor 1 is coupled to an amplifier 2 which is of conventional design and may provide either a fixed or adjustable gain. Amplifier 2 amplifies the input signal and applies it as a first input to a product detector 3, which also may be of conventional type. The output of the sensor 1 is further coupled through a tracking filter 4 and a frequency multiplier 5 as a second input to the product detector 3, being applied as a discrete frequency signal for mixing with the input signal frequency spectrum so as to generate a detected signal of interest reduced to base band. The tracking filter 3, may be of a conventional circuit which in its performance selects a dominant frequency component within the input frequency spectrum, such as the component of peak A in FIG. 3, and follows slight frequency variations thereof. The frequency multiplier 5 is a conventional component for multiplying the dominant frequency component up or down by a selected multiplication factor. The frequency multiplier positions the local oscillator signal applied to the product detector to a selected value within the input frequency spectrum, for example, at one of the peaks B, C, or D in FIG. 2, and thereby adjusts the base band of the detected output signal to that portion of the input spectrum which is of interest. It is noted that in practice many more peaks of frequency components of interest will be examined than the limited number illustrated in FIG. 2.

The output of the product detector 3 is connected to a band-pass filter 6, having, typically, a pass band of 5-500 Hz., with respect to which identifying signal characteristics are tabulated. The output of filter 6 is applied to a digital encoding component 7 which converts the analog signal to one or more digital signal sequences of binary "1's" and "0's." Selected signal characteristics in binary word form within the digital sequences are tabulated by connecting the output from the digital encoding component 7 through a shift register component 8, binary word module component 9 and an accumulator module 10. As will be seen more clearly when considering more detailed embodiments of the invention shown in FIGS. 3 and 6, the binary word module component 9 includes a multiplicity of binary word AND gates each responsive to a different combination of outputs taken from the shift register component 8, which output combinations constitute binary words to be tabulated. The shift register component 8 in providing parallel access to a multiplicity of bits within the digital sequence permits the formation of binary words of various lengths and numbers of bits within the binary word module component 9. The accumulator 10 tabulates the frequency of occurrence for each of the sensed binary words within the frequency band under examination during a given period.

The accumulated data from component 10 is connected through an output buffer network 11 to output component 12, which is typically a storage component compatible for providing computer inputs.

Figure 3:
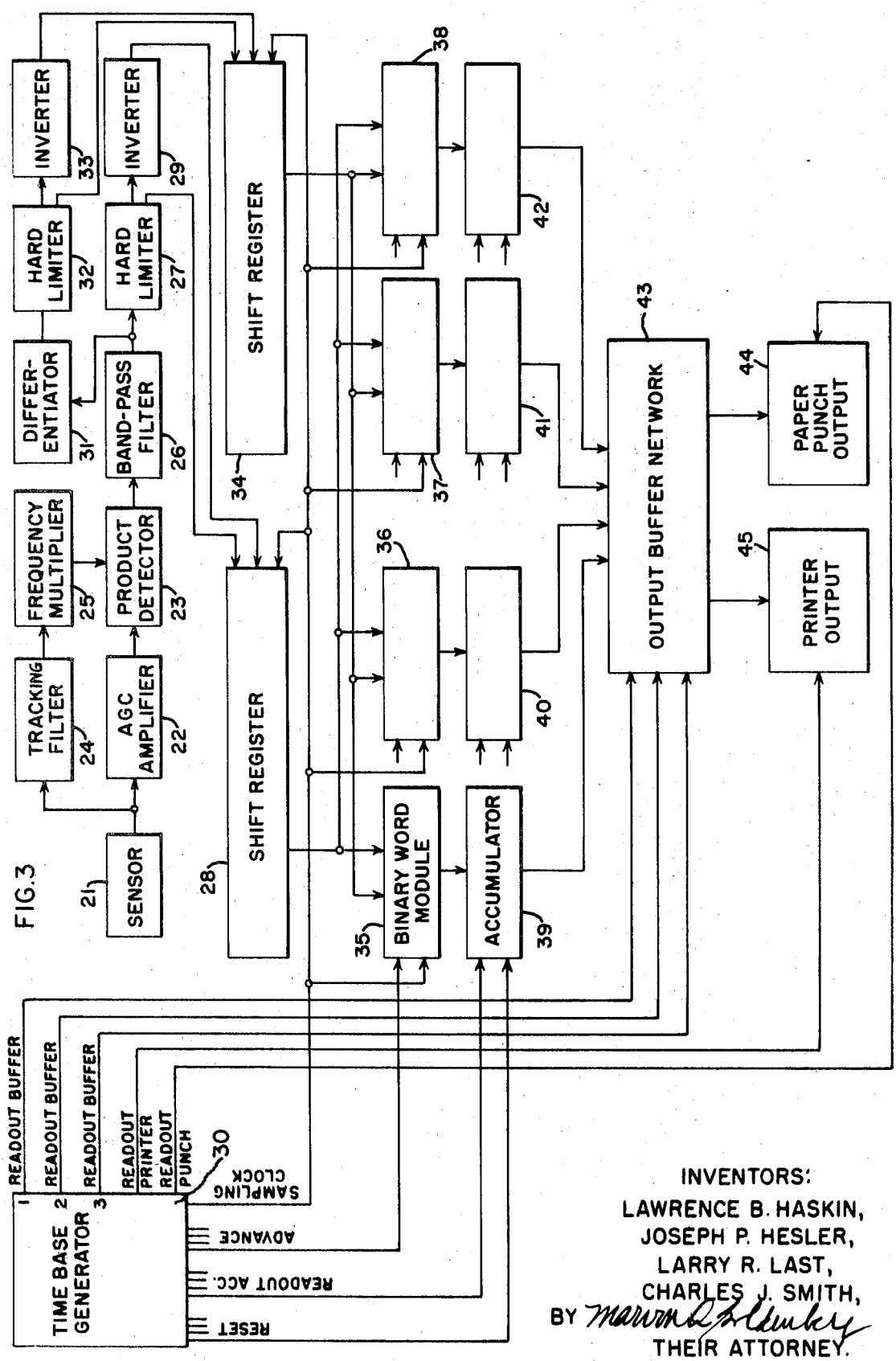
FIG. 3 is a schematic block diagram of a specific embodiment of the invention, which generally conforms to that of FIG. 1 with additional detail.

In FIG. 3 a more specific embodiment of the invention is illustrated. Similar to the figure previously considered, a sensor 21 provides its signal through an amplifier 22 as a first input to a product detector 23, the output of the sensor being further connected to a tracking filter 24 and a frequency multiplier 25 for providing a second input to product detector 23. In this embodiment, the amplifier 22 possesses automatic gain control which, as will be seen, is compatible with the form of encoding employed.

Figure 4:
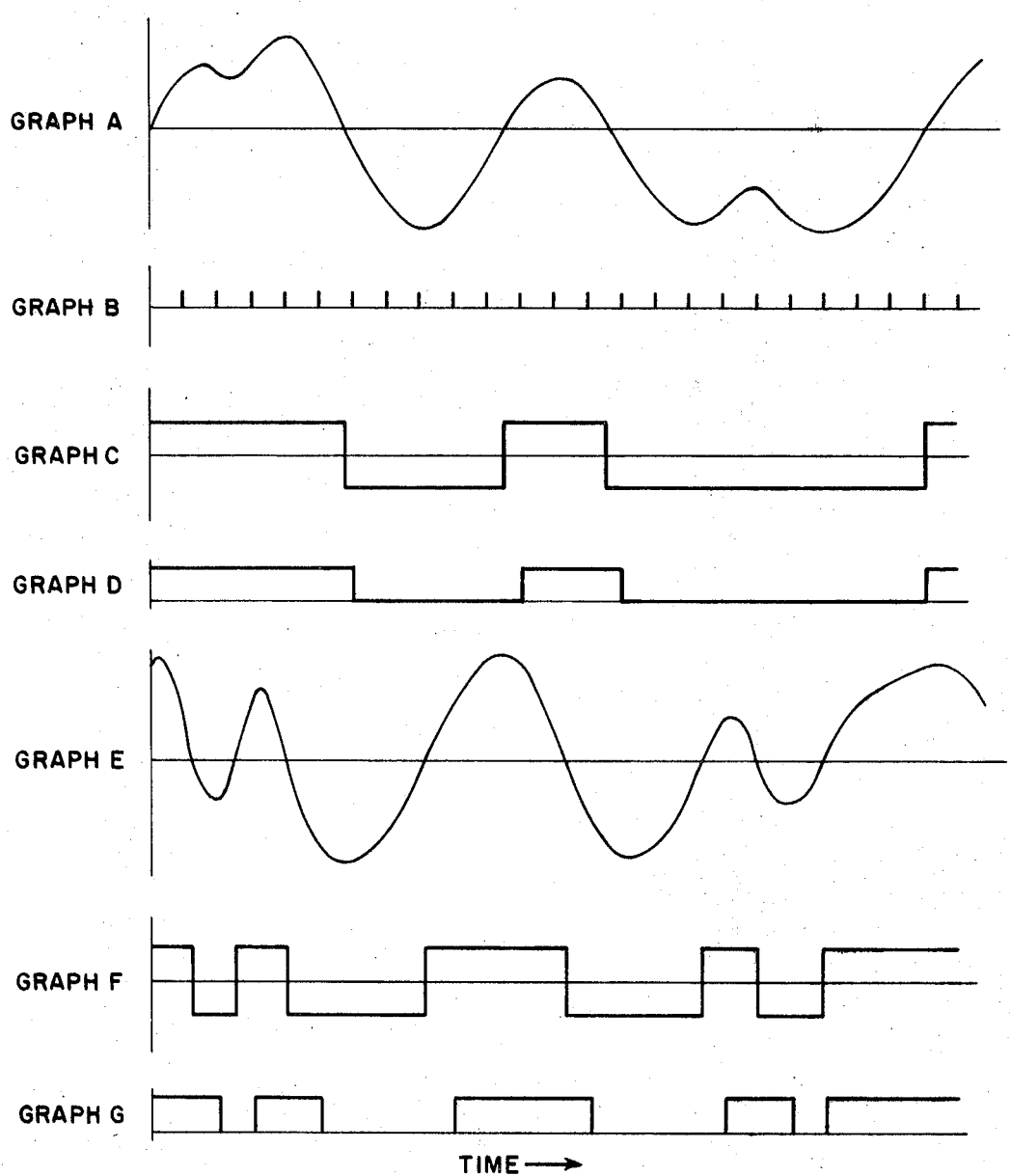
FIG. 4 is a series of graphs employed in an explanation of the operation of the system of FIG. 3.

The output of product detector 3 is connected to a band-pass filter 26 which as in the afore discussed embodiment provides an output waveform having a bandwidth of 5-500 Hz., an exemplary time function of the filtered signal being illustrated in Graph A of FIG. 4. A first output of filter 26 is sign encoded by being connected through a hard limiter 27 having one output directly connected to the input stage of a first shift register 28 and a complementary output connected through an inverter 29 to a second input shift register 28. A sampling clock signal from a time base generator 30 is further connected to the input stage of shift register 28 for entering the complementary binary bits into the register and shifting the bits previously entered. The sampling clock signal is shown by Graph B of FIG. 4. The hard limited signal at one output of limiter 27 is illustrated in Graph C of FIG. 4. The sign encoded binary sequence for the first shift register 28 is shown by Graph D of FIG. 4, wherein the rectangular areas of the waveform above the axis denote the presence of binary "1's" in the coded sequence and the intervals between such areas denote the presence of binary "0's."

A second output of band-pass filter 26 is connected through a differentiating network 31 providing a differentiated signal as shown by Graph E of FIG. 4. The differentiated signal is hard limited by limiter component 32, the outputs of which are made complementary by inverter 33 and coupled to the input stage of a second shift register 34. Also coupled to the input stage of the second shift register is the sampling clock pulse from time base generator 30. The hard limited signal at one output of limiter 32 is illustrated by Graph F of FIG. 4, and the slope encoded binary sequence for the second shift register 34 is shown by Graph G of FIG. 4. It is noted that the coding algorithms used herein define zero crossings of the input signal and its derivative without regard to amplitude variations. Thus, it is not necessary to provide gain calibration for the circuit. It should be pointed out, however, that the coding algorithms need not be limited to those employed herein but that other algorithms and different combinations thereof may be employed.

In the present embodiment each of the shift registers 28 and 34 contain a multiplicity of stages with the binary sequences applied to each being shifted through at the clock frequency. The outputs of the two shift registers are connected in various combinations for forming different binary words, to four binary word modules 35, 36, 37 and 38. As will be seen more clearly when considering the more detailed illustration of FIG. 6, each binary word module includes a number of logic gates which respond to the presence of different binary words within the binary sequences being investigated. The binary word modules 35-38 are coupled to associated accumulators 38, 40, 41 and 42, respectively, which tabulate the frequency of occurrence of the various binary words. The accumulators 39-42 are standard components which may typically include decade counters having four binary stages per decade. The outputs from accumulators 39-42 are coupled to an output buffer network 43 which applies the tabulated information to a standard paper punch apparatus 44 and a standard printer apparatus 45. Timing pulses coupled from time base generator 30 to the binary word modules, accumulators, paper punch and printer control the sequence of operations of these components.

Considering the operation of the system of FIG. 3, references will be made to the timing diagrams of FIG. 5. The received energy is transduced by the sensor 21 into an electrical signal extending over a frequency band of 0 to 15 kHz. A band of approximately 1000 Hz. within the received spectrum, 500 Hz. to either side of the dominant frequency of interest, is selected for the tabulation of the frequency of occurrence of certain binary words. Band selection is performed by setting the proper multiplication factor in the frequency multiplier 25. For example, if the principal frequency locked onto by tracking filter 24 is 6 kHz. and it is desired to tabulate data associated with the dominant frequency 12 kHz., a multiplication factor of two is set. This frequency beat with the input signal in the product detector then generates in conventional manner an output from the detector of the frequencies folded about 12 kHz. at base band. After passing through filter 26 the detected signal is digitally encoded into two binary sequences using two coding algorithms, as previously discussed.

Upon the dual binary sequences being entered into the shift registers 28 and 34 and being stepped through the various stages thereof at the clock frequency, illustrated by Graph A of FIG. 5, the binary word modules commence their operation in response to advance pulses applied from the time base generator 30, these pulses being narrow voltage spikes applied once every period $t$, defining the accumulation period. The advance pulse to module 35 is seen to be applied at times $T_0$, $T_1$, $T_2$, etc. with the advance pulses to modules 36, 37 and 38 being applied at successive quarter period intervals $t/4$ Thus, the operation of the binary word modules occur concurrently, but displaced in time for the purpose of multiplexing accumulated information into the output buffer network 43, as will be further explained. During the operation of each binary module following the application of the advance pulse, the presence of the binary words being examined is responded to at the sampling frequency and counted in the associated accumulator. It is noted that for ease of illustration in FIG. 5, the time scale is distorted in that the width of the pulses drawn are not accurately scaled to the period intervals. Further, only a representative number of sampling pulses per time period are illustrated. In practice there will be many times the number shown of sampling pulses per period. In one embodiment of the invention the time period $t$ was equal to one second and the sampling frequency 4,096 cycles per second.

Toward the end of each accumulation period for accumulator 39, a readout pulse shown by Graph C of FIG. 5, is applied for reading out the accumulated data into the output buffer network 43. Similarly, at successive quarter period intervals from the pulses of Graph C, readout pulses are applied to accumulators 40, 41 and 42 for sequentially reading out the data from these components into the network 43, shown by Graphs F, I and L of FIG. 5. The quarter period intervals define the readout period. Following each of the readout pulses to the accumulators and immediately prior to the next advance pulses, reset pulses are applied to the accumulators 39 through 42, shown by Graphs D, G, J and M for restoring their count to zero.

The readout pulses to the accumulators have a width several times that of the advance and reset pulses for accommodating readout of the output buffer network 43, which will become more apparent when considering in greater detail the operation of the buffer network as it is illustrated in FIG. 6. Further, it is noted that this readout pulse actually occurs during the time of the last sampling pulse of the period and the reset pulse occurs between sampling pulses, illustrated in FIG. 5A with the time scale expanded.

First, second and third readout pulses to network 43, shown by Graphs N, O and P, respectively, are applied to the output buffer network 43 for reading out information to paper punch 44 and printer 45. The first readout pulses of Graph N are voltage spikes which read out information to the printer 45 at quarter period intervals. These pulses accomplish a sequential readout of data from the four accumulators. Because in the present embodiment the data being read out in parallel to the printer is greater than the parallel capacity of the standard paper punch components, it becomes necessary to perform the readout operation to the paper punch 44 at a multiple of the frequency for readout to the printer 45, in this case twice this frequency. Additional logic is provided for performing this function as will be considered in the embodiment of FIG. 6. Accordingly, all three readout pulses to the network 43 are employed for readout to the paper punch 44. The second and third readout pulses of Graphs O and P are square waves of opposite phase, having the same repetition frequency as and occurring during the time between the first readout pulses. Print pulses for actuating the printer 45, shown by Graph Q, occur at the frequency of the first readout pulses to network 43. Punch pulses for actuating the paper punch 44, shown by Graph R, occur at twice this frequency.

In FIG. 6 is a detailed illustration of the present system showing that part of the system of FIG. 3 which includes the shift registers through the buffer output network, but showing only a single binary word module and accumulator. Components similar to those found in FIG. 3 are similarly identified but with a prime notation. Shift registers 28' and 34' are seen to be each composed of 45 stages, a few of which have been specifically identified. The number of stages is considered adequate to provide the necessary binary words required to investigate the band of frequencies that have been digitally encoded and supplied to the shift registers, and to detect all frequency components of interest.

Binary word module 35' includes 16 logic gates in the form of binary word AND gates, only five of which have been illustrated, identified as gates 59, 60, 61, 62 and 63. Module 35 also includes an advance counter 64, a conventional counter composed of four binary stages arranged so that in response to successive advance pulses there are provided sixteen discrete outputs to the AND gates 60 to 63 for sequentially operating said gates. There is further included a module output logic gate in the form of AND gate 65 to which each of the binary word AND gates are connected and to which the sampling clock pulse is connected for providing readout from the binary word module 35' to the accumulator 39' once every sampling period.

The binary word AND gates have selected binary words connected thereto, which words are composed of two, three and four bits taken from different stages of one or both registers and provided with various spacings between bits. The binary words need not be limited to four bits, but this number is adequate for the present application. Each bit of the binary words is identified by (1) coding sequence, i.e., 1 if the bit is taken from register 28' and 2 if taken from register 34'; (2) bit position, i.e., the stage in the register from which the bit is taken; and (3) bit polarity, i.e., a "1" or "0." Thus, bits 1, 3 "0" and 1, 43, "0" compose the binary word applied to AND gate 59. Correspondingly, a 2 bit word 1, 37, "1"–2,5, "0" is applied to AND gate 60; 3 bit word 1, 1, "0"–1, 23, "0"–1, 45, "0" is applied to AND gate 61, 4 bit word 1, 17, "0"–1, 45, "1"–2,3, "1"–2,31, "0" is applied to AND gate 62; and 4 bit word 2, 1, "1"–2,12, "0"–2,23, "1"–2, 45, "1" is applied to AND gate 63.

For a given sampling rate, each selected word is found to be associated with a particular frequency or group of frequencies within the frequency spectrum under investigation. Thus, the frequency of occurrence of a binary word is a function of the energy content of its associated frequency or frequencies. Binary words are selected which provide a fair distribution throughout the investigated frequency spectrum. The words that have been selected have approximately symmetrical spacings between bits and also have the following desirable characteristics: (1) They are associated with discrete frequencies which can be readily determined by mathematical analysis. (2) In a graph plotting their frequency of occurrence vs. input frequency under investigation, the peaks of the frequency of occurrence are uniform and generally symmetrical. (3) The word bits within a given word are non-correlative.

The following table presents a set of binary words possessing the above noted desirable characteristics which have been employed in one operable embodiment of the invention.

TABLE

| Number: | Binary word code | | | | Peak response frequencies in Hz. |
|---|---|---|---|---|---|
| 1 | 2,10,"0" | 1,19,"1" | 2,28,"1" | 1,37,"0" | 115 |
| 2 | 1,2,"1" | 2,15,"0" | 1,28,"0" | 2,41,"1" | 237 |
| 3 | 1,1,"0" | 1,23,"1" | 2,34,"0" | 1,45,"0" | 279 |
| 4 | 2,3,"1" | 1,11,"1" | 2,19,"0" | 1,27,"0" | 385 |
| 5 | 2,17,"0" | 1,24,"0" | 2,31,"1" | 1,38,"1" | 441 |
| 6 | 1,1,"0" | 1,23,"1" | 1,45,"0" | | 93, 280, 465 |
| 7 | 1,3,"1" | 1,19,"0" | 1,20,"0" | 1,35,"0" | 129, 383 |
| 8 | 1,2,"0" | 1,16,"1" | 1,30,"1" | 1,44,"1" | 146, 439 |
| 9 | 2,1,"1" | 2,12,"0" | 2,23,"1" | 2,45,"1" | 187 |
| 10 | 2,11,"0" | 2,20,"1" | 2,28,"0" | 2,38,"1" | 228 |
| 11 | 2,13,"1" | 2,21,"0" | 2,29,"1" | 2,37,"0" | 256 |
| 12 | 2,26,"0" | 2,32,"1" | 2,38,"0" | 2,44,"1" | 341 |
| 13 | 2,4,"1" | 1,30,"0" | 2,36,"0" | | 64, 320 |
| 14 | 2,3,"1" | 1,17,"0" | 2,31,"0" | 1,45,"1" | 74, 366 |
| 15 | 1,1,"1" | 2,12,"1" | 1,23,"0" | 2,34,"0" | 94, 465 |
| 16 | 1,4,"1" | 1,22,"0" | 2,31,"0" | 1,40,"1" | 113 |
| 17 | 1,3,"1" | 2,11,"1" | 1,19,"0" | 2,27,"0" | 127 |
| 18 | 1,15,"0" | 1,27,"1" | 2,33,"1" | 1,39,"0" | 170 |
| 19 | 1,1,"0" | 1,23,"0" | 1,45,"0" | | 186, 372 |
| 20 | 1,3,"0" | 1,13,"1" | 1,23,"0" | 1,43,"0" | 205 |
| 21 | 1,3,"0" | 1,12,"1" | 1,21,"0" | 1,39,"0" | 228 |
| 22 | 1,5,"1" | 1,21,"1" | 1,28,"0" | 1,37,"1" | 256 |
| 23 | 1,1,"0" | 1,8,"1" | 1,16,"0" | 1,31,"0" | 272 |
| 24 | 2,3,"1" | 2,17,"1" | 2,31,"1" | 2,45,"1" | 292 |
| 25 | 2,1,"1" | 2,14,"1" | 2,27,"1" | 2,40,"1" | 316 |
| 26 | 2,1,"0" | 2,12,"0" | 2,23,"0" | 2,45,"0" | 372 |
| 27 | 2,5,"1" | 2,15,"1" | 2,25,"1" | 2,35,"1" | 410 |
| 28 | 2,3,"0" | 2,21,"0" | 2,30,"0" | 2,39,"0" | 455 |
| 29 | 2,20,"0" | 2,28,"0" | 2,36,"0" | 2,44,"0" | 0, 500 |
| 30 | 1,3,"1" | 1,45,"1" | | | 96, 196, 292, 391, 488 |
| 31 | 1,3,"0" | 1,43,"0" | | | 103, 205, 308, 410 |
| 32 | 1,4,"1" | 1,42,"1" | | | 108, 215, 324, 431 |
| 33 | 1,8,"0" | 1,44,"0" | | | 114, 228, 341, 455 |
| 34 | 1,9,"1" | 1,43,"1" | | | 110, 241, 362, 482 |
| 35 | 1,6,"1" | 1,39,"1" | | | 124, 248, 372, 496 |
| 36 | 2,5,"0" | 1,37,"1" | | | 32, 160, 290, 418 |
| 37 | 1,4,"0" | 1,36,"1" | | | 64, 192, 320, 443 |
| 38 | 1,7,"0" | 1,38,"0" | | | 132, 264, 397 |
| 39 | 1,13,"0" | 1,42,"0" | | | 141, 283, 424 |
| 40 | 1,8,"0" | 1,35,"0" | | | 151, 304, 455 |
| 41 | 1,11,"0" | 1,36,"0" | | | 264, 328, 490 |
| 42 | 1,9,"0" | 1,32,"0" | | | 178, 357 |

It is noted that words 9, 14, 19, 31 and 36 are illustrated in FIG. 6.

The output of AND gate 65 is coupled to accumulator 39', shown to include a decade counter 66 composed of four stages, $10^0$, $10^1$, $10^2$, $10^3$, each stage including binary components having four outputs per stage. The sixteen outputs of the decade counter are coupled to further logic gates in the form of AND gates which connect to the output buffer network 43'. For purposes of illustration, only six of the sixteen AND gates are shown, these being labeled 67, 68, 69, 70, 71 and 72.

With respect to the output buffer network 43', there are included sixteen identical channels each having an OR gate, an inverter and a bistable multivibrator, to which the outputs from the AND gates of the accumulator components are connected. The channels are divided into two groups, one of which receives the output from stages $10^0$ and $10^1$ of the accumulators and the other receiving the outputs of the stages $10^2$ and $10^3$. Only the first two and last channels in each group are illustrated. Accordingly, the first channel of the first group includes a four input OR gate 73, one input of which is shown connected to the AND gate 67. Connections of the other three inputs, not shown in FIG. 6, are to corresponding AND gates in the remaining three modules. The output of OR gate 73 provides complementary inputs to a multiplier 75 by being connected through an inverter 74 to one input of the multivibrator and directly connected to a second input of said multivibrator. The first readout pulse to network 43' is connected to a third input of multivibrator 75. Multivibrator 75 has a first output connected to the printer component and a second output connected through a bank of logic gates, which will be described presently, to the paper punch component. The second channel of the first group includes an OR gate 76, one input of which is connected to AND gate 69, inverter 77 and a multivibrator 78, and the last channel includes an OR gate 79, one input of which is connected to AND gate 69, an inverter 80 and a multivibrator 81. The second and last channels are otherwise connected in corresponding manner to the first. Similarly, the first channel of the second group includes an OR gate 82, one input of which is connected to AND gate 70, an inverter 83 and a multivibrator 84; the second channel includes an OR gate 85, one input of which is connected to AND gate 71, an inverter 86 and a multivibrator 87; and the last channel includes an OR gate 88, one input of which is connected to AND gate 72, inverter 89 and a multivibrator 90. These channels are also connected in similar manner to that described, with a first output of the multivibrator components connected to the printer and a second output connected through the bank of logic gates to the paper punch.

The bank of logic gates include a plurality of AND gates 91, 92, 93, 94, 95, 96, and a plurality of OR gates 97, 98 and 99. AND gates 92, 94 and 96 have connected as a first input thereto the second outputs of multivibrators 75, 78 and 81, respectively. The second readout pulse to network 43' is connected as a second input to AND gates 92, 94 and 96. AND gates 91, 93 and 95 have connected as a first input thereto the second outputs of multivibrators 84, 87 and 90, respectively. The third readout pulse to network 43' is connected to a second input of AND gates 91, 93 and 95. The outputs of AND gates 91, 92 are connected to OR gate 97; the outputs of AND gates 93 and 94 are connected to OR gate 98; and the outputs of AND gates 95 and 97 are connected to OR gate 99.

Considering the operation of the circuit as illustrated in FIG. 6, in response to the sampling clock signal applied to shift registers 28' and 34', the digital sequences connected thereto are shifted through these shift registers at the clock frequency. As previously noted the sampling frequency applied in one operating embodiment of the invention was 4,096, found to be suitable for binary operations performed and for providing adequate data with respect to the tabulations required. The advance counter 64 in response to advance pulses sequentially enables each of the AND gates of the binary word module for a given accumulation period. In the example being considered the accumulation period $t$ was one second. As the digital sequences traverse the shift registers, the enabled AND gate of binary word module 35' provides an output when the binary word for which it is connected occurs in the sequence. This output is applied through AND gate 65 to the decade counter 66, which tabulates the number of times during an accumulation period that the word occurs. Thus, the counter 16 will count the frequency of occurrence of the binary word from AND gate 59 during the first second, the frequency of occurrence of the binary word from AND gate 61 during the next second, etc., until each of the words has had its frequency of occurrence tabulated. The first readout pulse to accumulator 39', which has been previously referred to in Graph C of FIG. 5, is applied to AND gates 67 through 72 for reading out data from the accumulator. During the application of the readout pulse to accumulator 39' there is applied a first readout pulse to the multivibrators of network 43' for transmitting the accumulated data from accumulator 39' through the buffer network 43' to the printer as well as to first inputs of the AND gates 91 through 96. Subsequent to the first readout pulse to network 43' are applied the second and third readout pulses to network 43' shown in Graphs O and P, respectively, of FIG. 5, which in sequence enable AND gates 92, 94 and 96 providing readout to the paper punch from the channels of group 1 during one-half of the readout period, and enable AND gates 91, 93 and 95 providing readout from the channels of group 2 during the second half of the readout period.

It is noted that the bits read out in parallel to the paper punch can be readily reduced in number to four by suitable modification to the bank of logic gates, i.e., connecting four logic AND gates to a single OR gate and doubling the frequency of the readout pulses to the logic AND gates.

Although the invention has been described with respect to a detailed embodiment for the purpose of clear and complete disclosure, it should be recognized that numerous modifications and changes may be made to the structure which would not exceed the basic inventive concepts herein presented. Thus, various parameters of the system, such as the number and composition of selected binary words, the sampling frequency, the timing operation, etc., may be modified in accordance with the needs of particular applications. As one example of this, the total readout time for reading out all binary word AND gates may be reduced by decreasing the ratio of gates to binary word modules. Thus, a maximum of 64 binary word AND gates can be provided by employing eight AND gates per module and eight modules, reducing the total readout time by almost a factor of two.

The appended claims are intended to include within their ambit these and all other modifications falling within the true scope of the invention.

What we claim as new and desire to secure by Letters Patent of the United States is:

1. A data tabulation system for analyzing data obtained from an input analog electrical signal, comprising:
   (a) input means responsive to said input analog signal for providing a detected signal in the form of an amplitude versus time function that includes frequencies within a restricted band of frequencies reduced to base band,
   (b) encoding means for sampling and encoding amplitude characteristics of said detected signal as at least a single digital sequence of binary "1s" and "0s,"
   (c) binary words means for examining the occurrence of selected binary words within said digital sequence,
   (d) accumulating means responsive to the output of said binary word means for accumulating data in the form of the frequency of occurrence of said selected binary words,
   (e) output means, and
   (f) output buffer means for coupling the accumulated data into said output means.

2. A data tabulation system as in claim 1 wherein said binary word means includes several binary word modules each having a plurality of binary word logic gates and a control means for sequentially enabling the logic gates of each module and coupling their outputs to said accumulating means, each logic gate being enabled for a period $t$, the control means of said several modules being operated in a time sequence of $t/n$, where $n$ is the number of modules.

3. A data tabulation system as in claim 2 wherein said accumulating means includes several accumulator components, one coupled to each binary word module, said accumulator components being controlled to provide outputs having the time sequence $t/n$, corresponding to the operation of said binary word modules.

4. A data tabulation system as in claim 3 wherein said accumulator components provide a plurality of parallel outputs.

5. A data tabulation system as in claim 4 wherein said output buffer means includes a plurality of logic channels, one for a corresponding output from each of said accumulator components, whereby in accordance with the time sequence control of said accumulator components accumulated data from said components is transferred through said logic channels in parallel to said output components.

6. A data tabulation system as in claim 5 wherein said output buffer means includes further logic means for coupling groups of said logic channels to said output means at one time.

7. A data tabulation system as in claim 2 wherein said input means includes a tracking filter for locking to a dominant frequency within the frequency spectrum of said input analog signal, a frequency multiplier for converting said dominant frequency to a second frequency, and a product detector to which are applied said input signal and said second frequency so as to generate said detected signal selected in accordance with said second frequency.

8. A data tabulation system as in claim 1 wherein said encoding means includes first means for deriving a first digital sequence of binary "1s" and "0s" and second means for deriving a second digital sequence of binary "1s" and "0s," said binary word means examining the occurrence of selected binary words within said first and second digital sequences.

9. A data tabulation system as in claim 1 wherein said first means is directly responsive to said detected signal and said second means is responsive to a derivative of said detected signal.

References Cited

UNITED STATES PATENTS

| | | | |
|---|---|---|---|
| 3,204,030 | 8/1965 | Olson et al. | 179—1 |
| 3,439,269 | 4/1969 | Fuchs | 179—1X |

EDWARD E. KUBASIEWICZ, Primary Examiner

U.S. Cl. X.R.

179—1